United States Patent
McElreath

(10) Patent No.: US 6,401,013 B1
(45) Date of Patent: Jun. 4, 2002

(54) METHOD AND SYSTEM FOR INTEGRATING A LAPTOP PC IN A COCKPIT

(75) Inventor: Kenneth W. McElreath, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/613,970

(22) Filed: Jul. 11, 2000

(51) Int. Cl.[7] .............................. G06F 7/00; B64C 19/02
(52) U.S. Cl. .............................. 701/3; 244/1 R; 345/2; 345/7; 345/205
(58) Field of Search .............................. 701/3, 24, 36; 244/1 R; 345/205, 2, 7, 8

(56) References Cited

U.S. PATENT DOCUMENTS

| | | | | |
|---|---|---|---|---|
| 4,584,603 A | * | 4/1986 | Harrison | 455/6.3 |
| 4,740,779 A | * | 4/1988 | Cleary et al. | 345/7 |
| 4,788,588 A | * | 11/1988 | Tomita | 348/602 |
| 4,866,515 A | * | 9/1989 | Tagawa et al. | 348/8 |
| 5,416,705 A | * | 5/1995 | Barnett | 701/14 |
| 5,519,410 A | * | 5/1996 | Smalanskas et al. | 345/7 |
| 5,610,822 A | * | 3/1997 | Murphy | 701/211 |
| 5,774,818 A | * | 6/1998 | Pages | 701/3 |
| 5,971,318 A | * | 10/1999 | Lustre | |
| 5,995,290 A | * | 11/1999 | Noble | 359/630 |
| 6,009,355 A | * | 12/1999 | Obradovich et al. | 701/1 |
| 6,112,140 A | * | 8/2000 | Hayes et al. | 701/14 |
| 6,122,575 A | * | 9/2000 | Schmidt et al. | 701/29 |
| 6,128,553 A | * | 10/2000 | Gordon et al. | 701/3 |
| 6,131,065 A | * | 10/2000 | Marszalek | 701/120 |
| 6,181,987 B1 | * | 1/2001 | Deker et al. | 701/3 |

* cited by examiner

Primary Examiner—William A. Cuchlinski, Jr.
Assistant Examiner—Olga Hernandez
(74) Attorney, Agent, or Firm—Nathan O. Jensen; Kyle Eppele

(57) ABSTRACT

A system and method for processing information on an aircraft in an economically efficient manner, in which a non-FAA certified removable laptop PC is intermittently coupled to and integrated with FAA certified avionics equipment on-board the aircraft, and the laptop is used to perform tasks which are not mandated by the FAA.

10 Claims, 1 Drawing Sheet

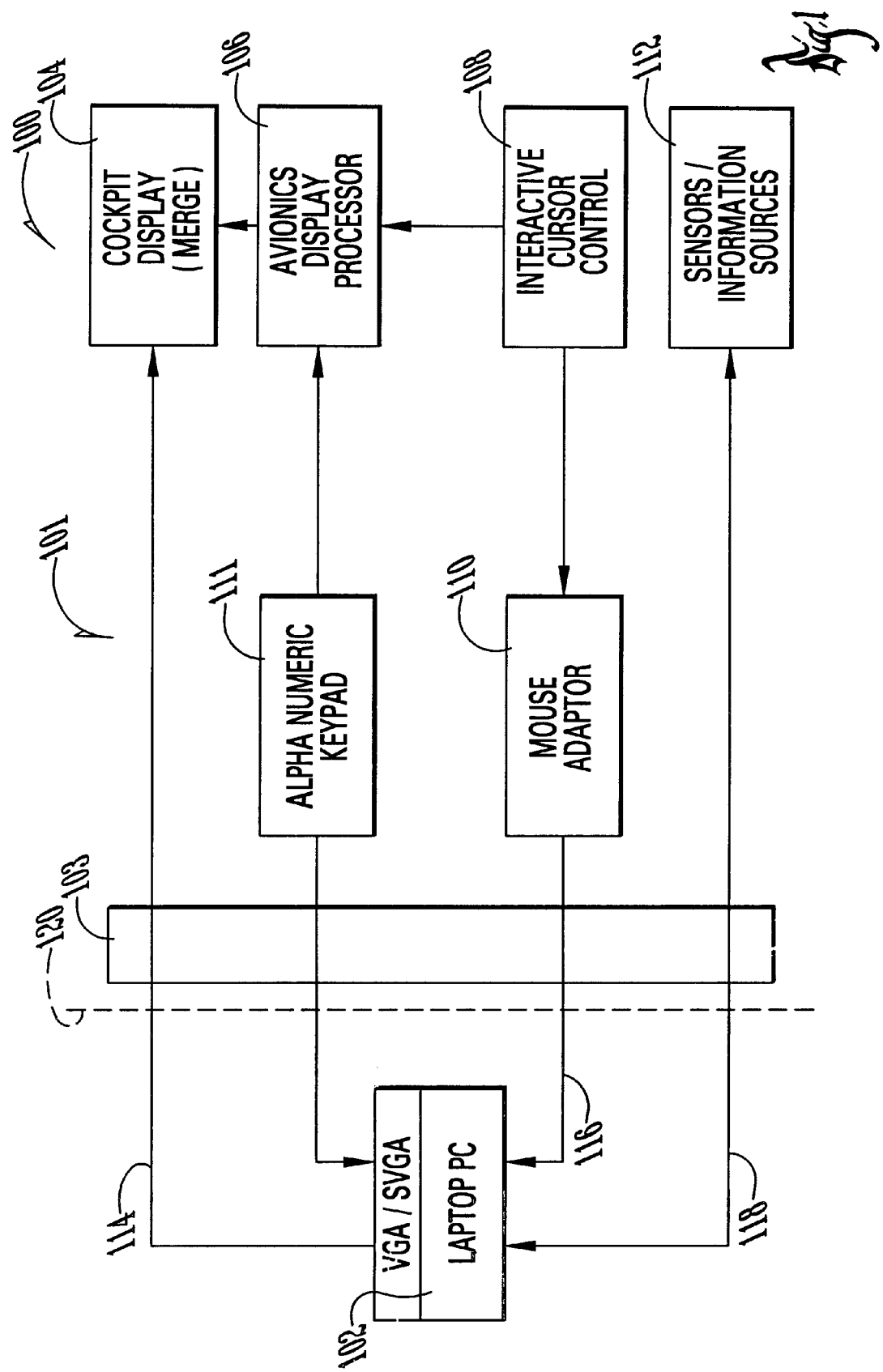

METHOD AND SYSTEM FOR INTEGRATING A LAPTOP PC IN A COCKPIT

FIELD OF THE INVENTION

The present invention generally relates to computers, and more particularly relates to personal computers, and even more particularly relates to methods and systems for integrating a laptop personal computer into a cockpit of an aircraft.

BACKGROUND OF THE INVENTION

In recent years, laptop personal computers have become increasingly prevalent in many industries. The aviation industry is no exception to this general trend. For example, Southwest Airlines has issued laptop computers to many of its pilots. These laptops are often used for route planning purposes, such as flight management, performance management, and optimization. The various tasks performed by these laptops are necessarily not tasks which are required by the FAA to be automated and optimized. For example, pilots can plan routes, descent rates, engine management, airspeed, etc., to optimize fuel consumption using such laptop computers.

While these laptops have cost advantages over traditional avionics equipment, such as FMSs, with the same capabilities, they do have some drawbacks as well. First of all, the laptop display is typically inadequate in the often very bright sunlight of a cockpit. Additionally, laptops usually lack sufficient viewing angle performance to permit cross-cockpit viewing of the display. Secondly, the mouse, touch pad, or cursor controller of a typical laptop is often unsuitable for use during flight, especially during times of moderate-to-high turbulence. Thirdly, these laptops are usually isolated from the information sources on the aircraft and on the ground. Lastly, these laptops often are required to be shut down during take-offs, approaches, and landings because of the often-high levels of electromagnetic interference they are known to cause.

Consequently, there exists a need for improved methods and systems for integrating laptop personal computers into the cockpit of an aircraft which overcome some of these shortcomings.

SUMMARY OF THE INVENTION

It is an object of the present invention to provide a system and method for integrating a laptop personal computer into an aircraft cockpit for use before, after, and during flight.

It is a feature of the present invention to utilize a selective connection between the laptop and an avionics display.

It is another feature of the present invention to include a mouse adaptor for coupling the laptop to the on-board cursor controller.

It is yet another feature of the present invention to include a data connection between the laptop and external data sources on the aircraft.

It is still another feature of the present invention to include a docking station having shielding around it to minimize electromagnetic interference (EMI).

It is an advantage of the present invention to achieve improved economic efficiency in on-board aviation computing.

It is a more specific advantage of the present invention to permit the use of a relatively low-cost laptop computer in an aircraft cockpit while simultaneously utilizing on-board avionics equipment to overcome some of the inherent shortcomings of a laptop computer.

The present invention is an apparatus and method for integrating a laptop computer into a cockpit, which is designed to satisfy the aforementioned needs, provide the previously stated objects, include the above-listed features, and achieve the already articulated advantages.

Accordingly, the present invention is a system and method including a shielded laptop personal computer coupled to on-board avionics equipment.

BRIEF DESCRIPTION OF THE DRAWINGS

The invention may be more fully understood by reading the following description of the preferred embodiments of the invention, in conjunction with the appended drawings wherein:

FIG. 1 is a simplified block diagram of an avionics system of the present invention.

DETAILED DESCRIPTION

Now referring to the drawings wherein like numerals refer to like matter throughout, and more specifically referring to FIG. 1, there is shown an avionics system of the present invention generally designated 100, including a laptop PC 102 disposed in an aircraft cockpit 101. Laptop personal computer, laptop PC and laptop are used interchangeably herein to refer to a portable general-purpose computer of the type having a main section with an integrated keyboard; a display screen hinged along its bottom side to a top or back edge of the main section, and a plurality of blind-mating electrical connectors disposed along the back side of the main section.

Throughout this description, reference is made to a laptop PC because it is believed that the beneficial aspects of the present invention would be most readily apparent when used in connection with laptop PCs; however, it should be understood that the present invention is not intended to be limited to laptop PCs and should be hereby construed to include other non-laptop PCs, such as, but not limited to the following: palm PCs, portable PCs, desktop PCs, industrial PCs, and others as well. For example, industrial or rack-mounted PCs often achieve higher reliability performance than typical laptop computers. These industrial PCs often have fault and environmental monitoring features included therein and could be quite beneficial to the present invention under certain circumstances.

Also shown in FIG. 1 is a laptop PC shielded docking station 103. Laptop PC shielded docking station 103 can be any type of device which is coupled to or positioned about the laptop PC 102 so as to reduce EMI. Laptop PC shielded docking station 103 could be a simple shielded enclosure device or other known devices using well-known techniques to reduce the undesirable laptop PC 102 generated effects of EMI on other avionics equipment in the cockpit 101. Preferably, laptop PC 102 is a commercially available product which requires no modifications for integration with the system 100. Computer industry standards dictate the formats of the wires, connectors, and the signals on those connectors so as to permit laptop PC 102 to work with industry standard peripheral devices. For example, these current industry standards often include a display output line 114, which carries a standard RGB signal formatted in a VGA or SVGA standard format.

It should be understood that these industry standard formats are constantly evolving. The standards mentioned herein are for illustration purposes only and are not intended to be limiting. For example, the present invention is intended to be adapted so as to accommodate new industry standards as they arise in the future. As is the nature of such industry standards, they are now, and will, when developed and adopted in the future, be well known in the industry. Consequently, it is believed that persons skilled in the art will be readily able to adapt the present invention to work with these future and currently unknown standards.

Other outputs from laptop PC 102 are a standard mouse interface on-line 116, as well as a standard data port on-line 118 such as a serial port, RS 232, USB or others. Lines 114, 116, and 118 are preferably electrical conducting wires. However, any means for conveying information could be used as well, such as IR, RF, optical, etc.

The vertical dashed line 120 symbolizes the separation between the movable laptop PC 102 together with its industry standard components, etc., and the installed equipment in the cockpit 101. To the left of line 120 are relatively inexpensive commercially available products which are not made to the standards of the Federal Aviation Administration (FAA). To the right of line 120 are the on-board components of the present system 100. These on-board components are generally required to meet strict regulations administered by the FAA. The laptop PC shielded docking station 103 would be on-board the aircraft and, therefore, would likely have FAA requirements associated with it.

Also on the right side of line 120 is integrated cockpit display 104. This integrated cockpit display 104 is intended to be an industry standard avionics display, such as a 5ATI, ARINC D sized display or a 6×8 display. (The industry standards to the right of line 120 are equally addressed in the above discussion on evolution of standards and the intended scope of this patent.) Integrated cockpit display 104 is coupled to an avionics display processor 106, which are both well known in the art. Interactive cursor controller 108 is a relatively new addition to the known aviation environment, but is now well known. Interactive cursor controller 108 is a cursor controller which is designed to be used in the often hostile environment of a cockpit. The styles and features of interactive cursor controller 108 are expected to vary depending upon user preferences and customer requirements. However, these interactive cursor controllers 108 typically do not operate with connectors and signal formats which are identical to those in the consumer PC market. The mouse adaptor 110 is intended to represent an adaptor or translator for assuring proper cooperation between these often divergent standards. Mouse adaptor 110 is a relatively simple device which could be readily made and adapted for changing standards on both sides of the line 120. Alpha numeric keypad 111 is intended to be similar to mouse adaptor 110, except that it relates to functions typically performed by a computer keyboard.

In operation, the system 100 of the present invention works as follows:

A laptop PC 102, which is a non-FAA certified computer, preferably a relatively low cost consumer device, is provided and is placed in lap top PC shielded docking station 103 and the appropriate electrical connections are made in a well-known manner. Laptop PC 102 then provides a display output on line 114, which is received by integrated cockpit display 104, which has been adapted, along with avionics display processor 106, to provide for the receipt of signals from an external source (laptop PC 102). Known techniques of assuring integrity of the devices integrated cockpit display 104, avionics display processor 106, interactive cursor controller 108, mouse adaptor 110, and sensors/information sources 1 12, are employed to assure that the use of laptop PC 102 will not corrupt any such avionics equipment which is on-board and under FAA control. The security steps are not trivial, but are certainly readily performed by a person having ordinary skill in the art, since they are commonly employed in FAA-certified avionic systems to separate and isolate functions of varying levels of flight criticality. Depending upon the exact system 100, which is variable based upon designer's choice, customer requirements, and FAA regulations, these security steps will be varied as well. One example of such a security step would occur at integrated cockpit display 104, where a menu for controlling the integrated cockpit display 104 would be adapted to allow for termination of display of information normally displayed thereon and the commencement of a display of information from the laptop PC 102. Depending upon variable requirements, other arrangements, such as split screens, showing information from laptop PC 102 and on-board FAA controlled equipment, could be implemented through an adapted display control menu.

Sensors/information sources 112 could be any on-board or ground-based source of information which is otherwise available to the pilot and on-board avionics equipment. Known techniques of assuring integrity of this information could be employed to prevent corruption caused by laptop PC 102. Depending on customer requirements, user preferences, and FAA regulations, among others, these security steps or other known techniques of assuring integrity could be performed in various ways and in various places on the aircraft.

Throughout this discussion, reference is made to the FAA; however, it should be understood that the name of this agency and/or its charter may change over time. It is the intention of the present invention to include within the definition of FAA, in the specification and in the claims, any agency, department, public corporation, etc., of the United States government which regulates air travel and/or air safety. Similarly, references are made herein to review and certification by the FAA. These references are intended to include any type of approval or certification including, but not limited to FAA TSOs, original or Supplemental Type Certificates for aircraft, or Federal Air Regulations.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. An aviation electronics system comprising:
   an avionics display device mounted in an aircraft cockpit;
   said display device coupled to on-board aviation electronics equipment;
   a PC coupled to said avionics display device; an interactive cursor controller coupled to said aviation electronics equipment; and,
   a mouse adaptor coupled to said interactive cursor controller, said mouse adaptor for translating signals exchanged between said PC and said interactive cursor controller.

2. A system of claim 1 further comprising:
   a plurality of sensors/information sources coupled to said aviation electronics equipment and said PC.

3. A system of claim 2 wherein said avionics display has a menu control for enabling receipt and display of information from said PC, where a selection process ensures independence and integrity of normal avionics functions to satisfactory civil air-worthiness requirements of said normal avionics functions.

4. A system of claim 3 further comprising:
   a shielding enclosure disposed in said aircraft cockpit for receiving said PC and thereby reducing EMI caused by said laptop PC.

5. A system of claim 4 wherein said PC is a commercially available PC.

6. A system of claim 5 wherein said plurality of sensors/information sources include a GPS receiver.

7. A method of-processing information on-board an aircraft comprising the steps of:
   providing avionics equipment installed in said aircraft, where said avionics equipment has received an FAA review and certification;
   coupling a PC which has not received an FAA review and certification, to said avionics equipment;
   generating PC information on said PC;
   generating avionics information on said avionics equipment; and
   transferring information across a connection between said PC and said avionics equipment;
   wherein said step of providing avionics equipment includes providing an avionics display and said step of transferring information includes providing said avionics display with said PC information.

8. A method of claim 7 wherein said avionics information is provided to said PC for use by said PC in performing tasks on said PC, wherein said tasks are not tasks which are part of an FAA requirement which mandates that such tasks be performed with an FAA certified avionics apparatus; and
   wherein said tasks include a task of managing fuel consumption.

9. A method of processing information on-board an aircraft comprising the steps of:
   providing avionics equipment installed in said aircraft, where said avionics equipment has received an FAA review and certification;
   coupling a PC which has not received an FAA review and certification, to said avionics equipment;
   generating PC information on said PC;
   generating avionics information on said avionics equipment; and
   transferring information across a connection between said PC and said avionics equipment;
   wherein said avionics information is provided to said PC for use by said PC in performing tasks on said PC, wherein said tasks are not tasks which are part of an FAA requirement which mandates that such tasks be performed with an FAA certified avionics apparatus; and
   wherein said tasks include calculating weight distribution characteristics relating to loading of said aircraft.

10. A system on-board an aircraft, the system comprising:
    an FAA certified avionics display device, fixed in a void in an instrument panel in said aircraft, said avionics display for displaying information to a pilot;
    an FAA certified avionics display processor, coupled to said avionics display, for providing signals to said avionics display;
    an FAA certified interactive cursor controller, coupled to said avionics display processor, said cursor controller for permitting a pilot to manipulate a cursor on said avionics display, during times of turbulent flight;
    an FAA certified GPS receiver, disposed on said aircraft;
    an FAA certified shielding barrier for reducing EMI external thereto from a source of EMI disposed therein;
    a non-FAA certified PC, disposed in said shielding barrier, said non-FAA certified PC having output signals which include RS232 serial port signals, computer industry standard mouse control signals, and industry standard display signals;
    an FAA certified mouse adaptor for translating signals to and from said interactive cursor controller so as to be compatible with an industry standard mouse interface on the non-FAA certified PC;
    an FAA certified alphanumeric keypad that acts as a keyboard for the non-FAA certified PC using a standard PC keyboard interface; and
    whereby said non-FAA certified PC is selectively permitted to drive said avionics display, said GPS receiver provides position related information to said non-FAA certified PC, and said interactive cursor controller is used to control a cursor generated by said non-FAA certified PC.

* * * * *